United States Patent [19]
Henderson

[11] Patent Number: 6,035,214
[45] Date of Patent: Mar. 7, 2000

[54] LAPTOP COMPUTER WITH INTEGRATED TELEPHONE

[75] Inventor: Donnie Henderson, Manalapan, N.J.

[73] Assignee: AT&T Corp, New York, N.Y.

[21] Appl. No.: 09/028,820

[22] Filed: Feb. 24, 1998

[51] Int. Cl.[7] .............................. H04M 11/00; H04Q 7/32
[52] U.S. Cl. .......................... 455/556; 455/557; 345/905; 361/680
[58] Field of Search .................................. 455/556, 557, 455/74, 90, 575, 550; 379/100.01, 102.03, 433, 446, 447, 455; D14/138, 117.3; 345/901, 905; 361/679, 680, 681, 686

[56] References Cited

U.S. PATENT DOCUMENTS

| | | | |
|---|---|---|---|
| 5,020,090 | 5/1991 | Morris | 455/556 |
| 5,115,374 | 5/1992 | Hongoh . | |
| 5,127,050 | 6/1992 | Takahashi et al. | 379/428 |
| 5,353,331 | 10/1994 | Emery et al. . | |
| 5,469,496 | 11/1995 | Emery et al. . | |
| 5,481,561 | 1/1996 | Fang . | |
| 5,506,887 | 4/1996 | Emery et al. . | |
| 5,566,226 | 10/1996 | Mizoguchi et al. | 455/558 |
| 5,579,379 | 11/1996 | D'Amico et al. . | |
| 5,610,972 | 3/1997 | Emery et al. . | |
| 5,625,673 | 4/1997 | Grewe et al. | 455/556 |
| 5,657,258 | 8/1997 | Grewe et al. . | |
| 5,664,005 | 9/1997 | Emery et al. . | |
| 5,790,644 | 8/1998 | Kikinis | 379/144 |
| 5,819,185 | 10/1998 | Umezawa et al. | 455/575 |
| 5,903,631 | 5/1999 | Smith et al. | 379/90.01 |
| 5,907,815 | 5/1999 | Grimm et al. | 455/557 |
| 5,930,719 | 7/1999 | Babitch et al. | 455/462 |

*Primary Examiner*—Dwayne D. Bost
*Assistant Examiner*—Erika A. Gary

[57] ABSTRACT

A laptop has an integrated telephone, in which the telephone and mouse unit are arranged in a manner that allows the mouse to be adjusted to either side of the laptop computer to accommodate either a left-handed or right-handed person. A telephone is tightly integrated into the body of a laptop PC creating a much more natural and ergonomic physical interface between the phone and the computer. The resulting device includes a mounting for the mouse module, allowing ease of use by both right-handed and left-handed users. The laptop computer includes a recessed storage area for the small telephone handset. The storage area is located in the area just below the keyboard, i.e., the area where the user's wrists usually lie. The telephone handset and associated cable reside in the tray. The mouse module slides along a guide way in the tray, and can be positioned on either side of the guide tray/telephone handset storage tray. The benefits of the above tight integration of the laptop PC and the telephone are many. First, one's laptop becomes one's telephone console. Second, the resulting telephone has local user programmable processing and a large storage area. Furthermore, the telephone has a large high resolution display. Moreover, integrating an IP telephone into the laptop allows communication over the same network IP links that the laptop communicates over normally. Finally, this does not preclude the inclusion of a standard PSTN telephone in the laptop.

50 Claims, 6 Drawing Sheets

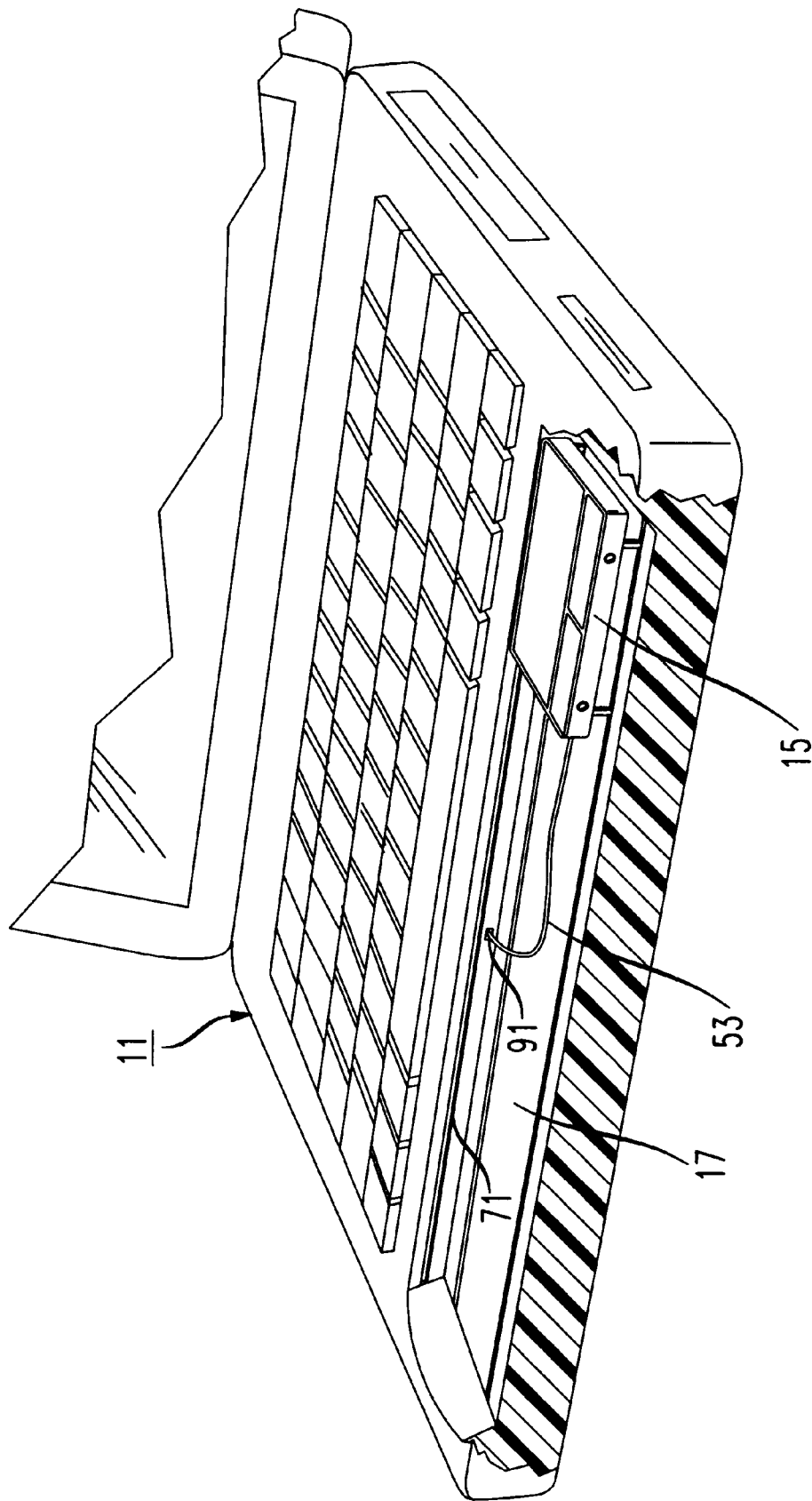

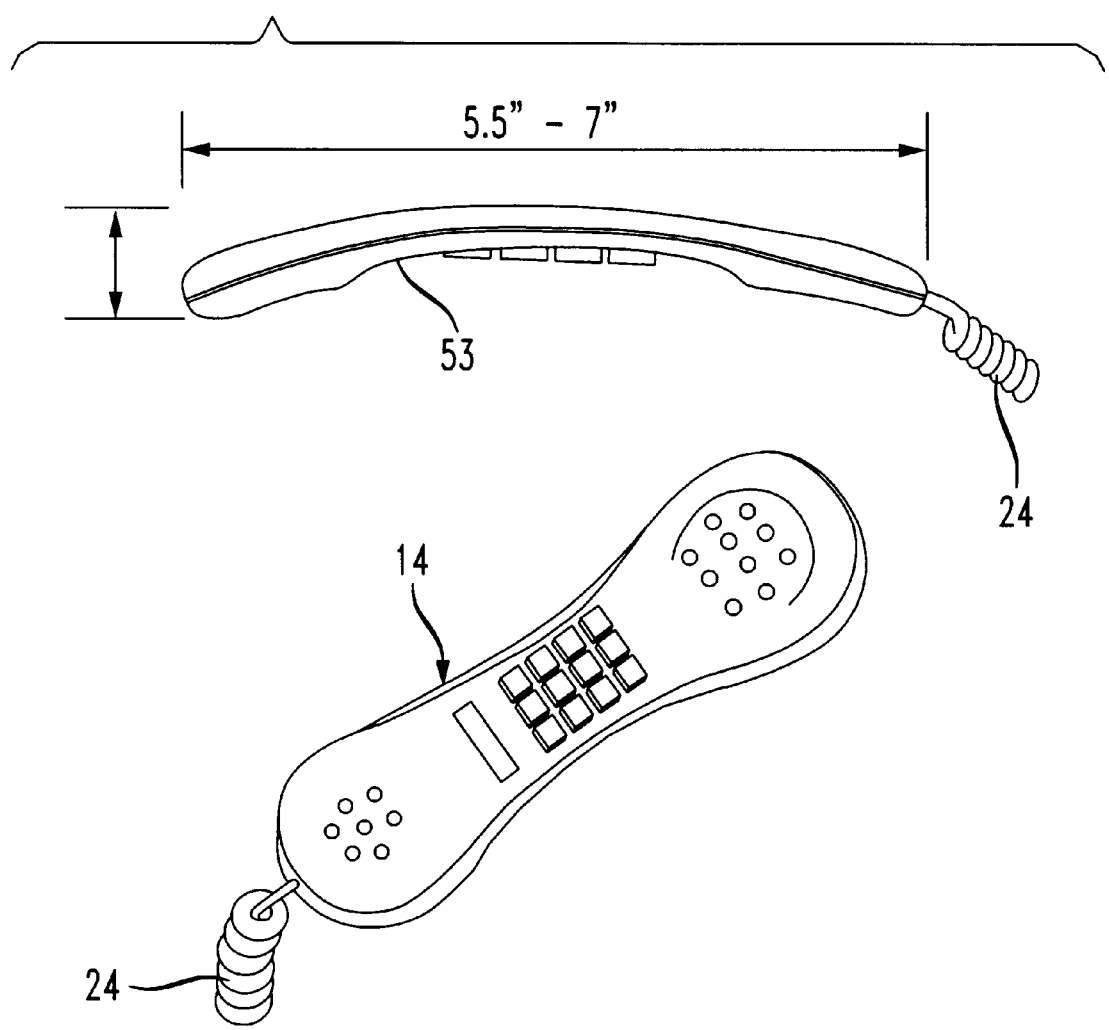

LAPTOP COMPUTER WITH INTEGRATED TELEPHONE

BACKGROUND OF THE INVENTION

The present invention relates generally to portable computers, and more particularly to a portable computer with an integrated telephone.

Telephone systems are becoming available that allow users to place "telephone" calls over computer networks, such as the Internet. In addition, Internet-enabled telephone sets will soon give users the ability to access the World Wide Web and browse, read E-mail, and access and display various text and graphical information from computer networked sources, all without the need for a Personal Computer (PC). The "IP" phones come in several basic forms. One form is a fully integrated unit with a base, a handset, and usually small two-six inch diagonal display screen of some sort. Another form is a peripheral device that plugs into a input/output port on the user's PC. This phone usually resembles a conventional slimline desk phone. Here the IP phone usually has a support application running on the user's PC. However, the IP phone is not easily integrated into the PC.

One technique for integrating the telephone and PC is disclosed in U.S. Design Patent No. 284,193, which discloses a portable computer with a telephone disposed on the left side of the PC. Essentially, this is a laptop computer with a telephone hanging off the side. While useful, this device does not completely integrate the telephone into the computer in an ergonomic manner.

The present invention is directed to the problem of developing an integrated telephone and PC in which the telephone is ergonomically incorporated into the layout of the PC.

SUMMARY OF THE INVENTION

The present invention solves this problem by providing a laptop computer with a telephone incorporated at the base of the keyboard and a mouse, which can be located either at the left side or right side of the keyboard to accommodate a right- or left-handed person.

According to the present invention, a computer with an integrated telephone includes a telephone handset, a user point and click input module, a tray in which the user input module is located, and a slidable connector mechanism. The tray is disposed parallel to the front of the computer. The slidable connector mechanism couples the user point and click input module to the laptop computer. The user point and click input module is moveable from a left side to the right side of the computer to accommodate a right- or a left-handed user, and the telephone handset is disposable in a space in the tray not occupied by the user point and click input module.

According to one aspect of the present invention, the above computer also includes a glide control mechanism disposed in the tray and locking the user point and click input module in the tray and controlling a movement of the user point and click input module in the tray.

According to another aspect of the present invention, a computer and telephone apparatus includes a laptop computer having a front edge and two sides, and a telephone handset coupled to the laptop computer. The user input module is coupled to the laptop computer. A storage area in which the user input module and telephone handset are disposed is located perpendicular to the sides of the laptop computer. A slidable connector mechanism couples the user point and click input module to the laptop computer, wherein the user point and click input module is moveable from a left side to the right side of the computer to accommodate a right- or a left-handed user, and the telephone handset is disposable in a space in the tray not occupied by the user point and click input module.

According to another aspect of the present invention, an integrated computer and telephone device includes a computer having a front edge, and two sides, and a telephone handset coupled to the computer. A user point and click input module is also coupled to the computer. A tray in which the user point and click input module and telephone handset are disposed is located parallel to the front edge of the computer. An infrared communications port couples the user point and click input module to the laptop computer, wherein the user point and click input module is moveable from a left side to the right side of the computer to accommodate a right- or a left-handed user, and the telephone handset is disposable in a space in the tray not occupied by the user point and click input module.

According to yet another aspect of the present invention, an integrated computing and communication device includes a computer having a front edge and two sides, and a telephone coupled to the computer. The user input means enables a user to provide input to the computer, is coupled to the computer and is movable from a right side of the device to a left side of the device. A receptacle means for the telephone and the user input means is disposed parallel to the front edge of the computer. A coupling means couples the user input means to the computer, and provides coupling between the computer and the user input means whether the user input means is located on the right side of the device or the left side of the device.

BRIEF DESCRIPTION OF THE DRAWINGS

FIG. 9 depicts a cutaway side view of one embodiment of the present invention.

FIG. 10 depicts the telephone handset of one embodiment of the present invention.

DETAILED DESCRIPTION

The present invention includes a laptop and integrated telephone, in which the telephone and user click and point input unit (we shall use this term interchangeably with "mouse" for convenience purposes, however, such usage should not limit its definition, which should be as indicated below), are arranged in a manner that allows the mouse to be adjusted to either side of the laptop computer to accommodate either a left-handed or right-handed person. According to the present invention, a telephone is directly integrated into the body of a laptop PC creating a much more natural and ergonomic physical interface between the phone and the computer.

The telephone handset is integrated into the body of a laptop PC. The resulting device includes a novel mounting for the mouse module, allowing ease of use by both right-handed and left-handed users.

According to one aspect of the present invention, the laptop computer includes a recessed storage area (which we shall call a tray) for the small telephone handset. The storage area is located in the area just below the keyboard (i.e., the area where the user's wrists usually lie). The telephone handset and associated cable reside in the tray. The mouse module slides along a guide way in the tray, and can be positioned on either side of the guide tray/telephone handset storage tray.

The benefits of the above tight integration of the laptop PC and the telephone are many. First, one's laptop becomes one's telephone console. Second, the resulting telephone has local user programmable processing and a large storage area. Furthermore, the telephone has a large high resolution display. Moreover, integrating an IP telephone into the laptop allows communication over the same network IP links that the laptop communicates over normally. Finally, this does not preclude the inclusion of a standard PSTN telephone in the laptop.

Figure 1:
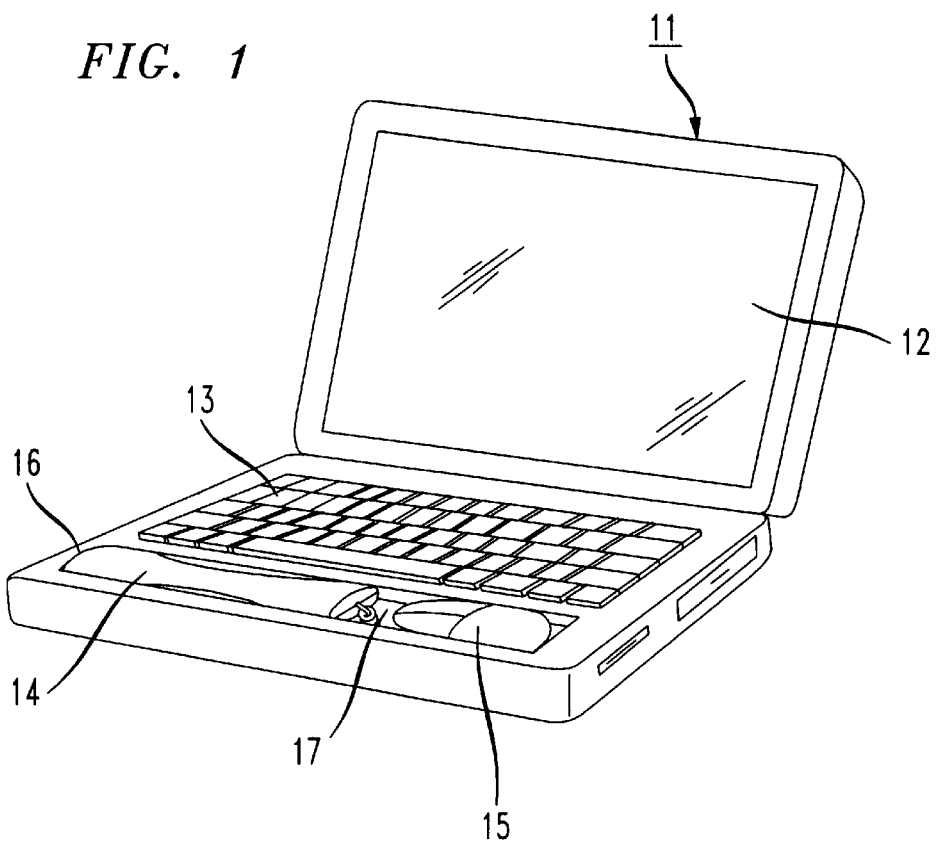
FIG. 1 depicts one embodiment of the integrated telephone and computer according to the present invention.

FIG. 1 depicts one possible embodiment of the present invention, in which a laptop computer 11, with a display 12, keyboard 13, telephone handset 14 and mouse module 15 is depicted. The front area 16 of most modem laptops serves as a wrist rest during typing to attempt to alleviate repetitive motion strain on the wrist. According to the present invention, the integrated telephone handset 14 lies in the front rest area 16 and maintains the same profile as the front rest area 16 of the laptop 11 to allow for comfortable typing. Furthermore, the telephone handset 14 has as slim a profile as possible to prevent from increasing the thickness of the laptop computer 11 and to intrude as minimally as possible.

According to one aspect of the present invention, the touch mouse 15 is mounted in a tray 17 along with the telephone handset 14 in the front area 16. Thus, the touch mouse 15 can slide to either side of the laptop body 11 to accommodate a right-handed or left-handed user, i.e., the telephone handset and mouse position are interchangeable. The length of the tray equals the sum of the lengths of the telephone handset 14 and the mouse module 15, plus some buffer spacing.

Telephone Handset

Figure 2:
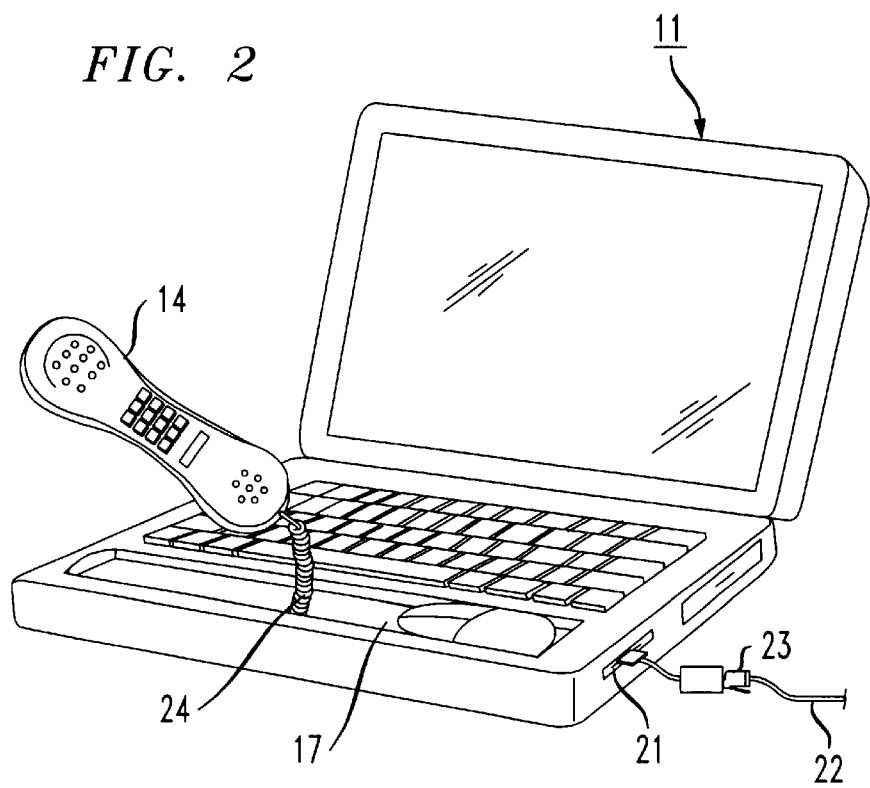
FIG. 2 depicts a side view of one embodiment of the present invention, in which a standard telephone handset is employed.

There are many possibilities for the telephone handset 14. The telephone handset 14 can be directly wired to the laptop 11, as shown in FIG. 2, which depicts the integration of a standard telephone POTS 14 with a laptop 11. Shown in FIG. 2 is an RJ-11 jack 23 extending from the end of the telephone handset 14. Also shown in FIG. 2, is the telephone line 22, which connects to the PC MCIA card 21 to which the cord 24 is connected in the laptop 11. In this case, there is an internal connection made between the telephone handset 14 and the modem card, e.g., the PC MCIA card 21.

Figure 3:
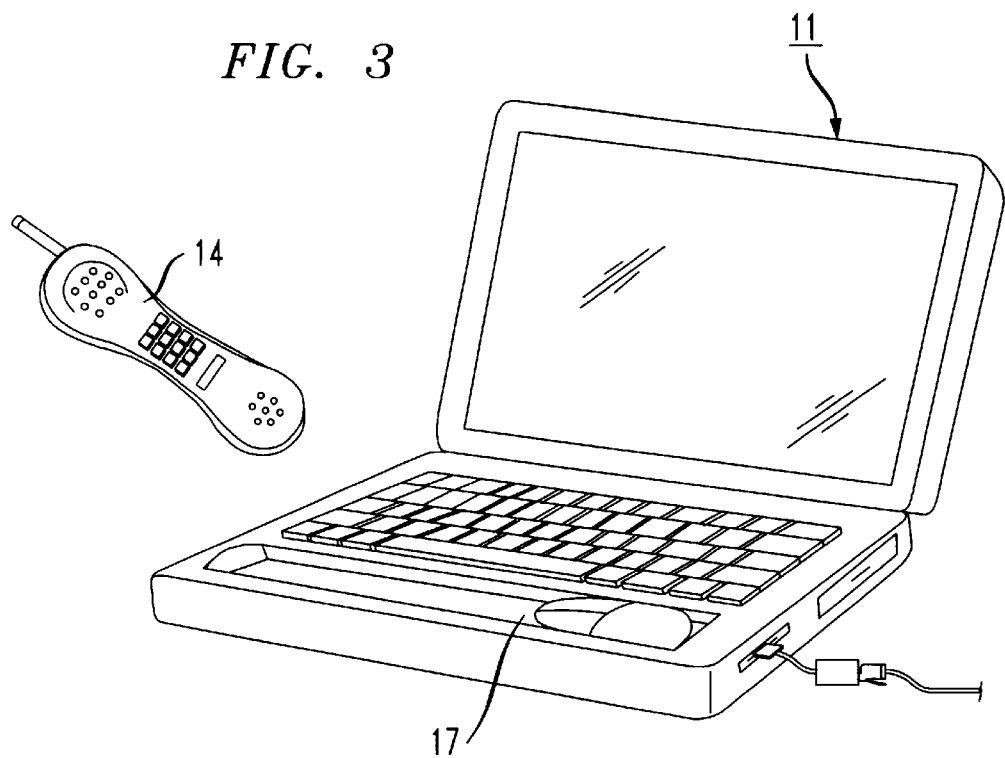
FIG. 3 depicts a side view of another embodiment of the present invention, in which a cellular/wireless telephone handset is employed.

Alternatively, the telephone handset 14 can be a cordless telephone, or a wireless telephone (i.e., cellular or PCS) (see FIG. 3). The telephone handset 14 could even operate over a short RF or IR link to a modem card inside the laptop 11. The handset 14 may or may not include a dial pad. In the case of a PSTN or an Internet-enabled telephone, the dialing can be done either via a local pad (dial pad) integrated in the handset or via the keyboard of the laptop 11.

Figure 4:
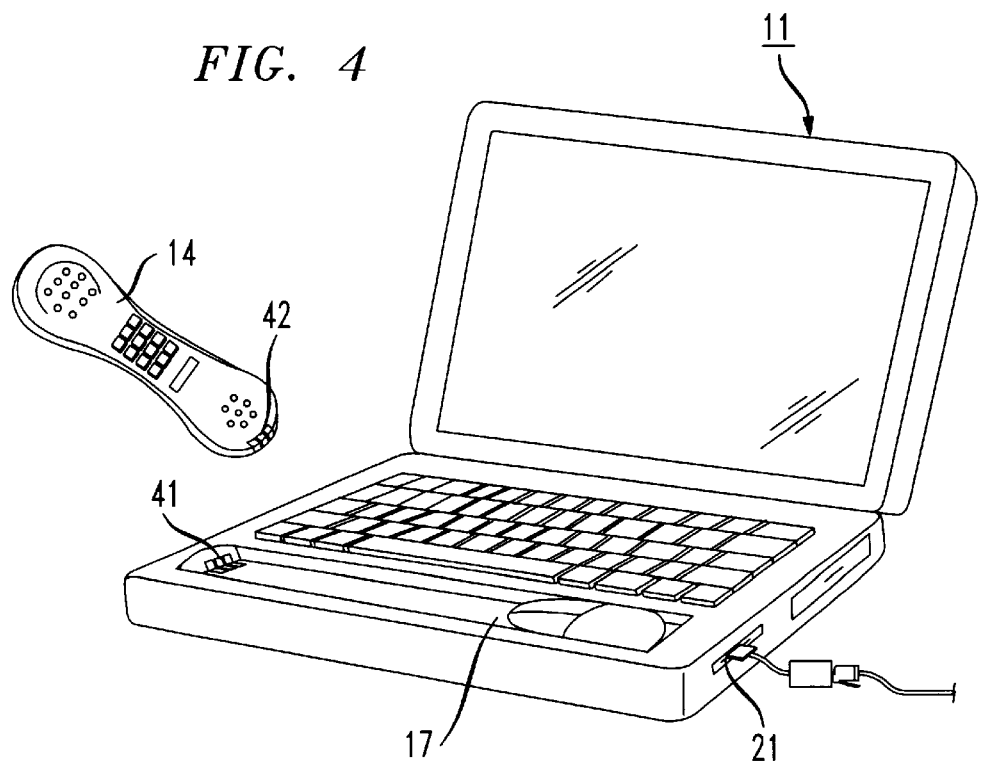
FIG. 4 depicts a top view of one embodiment of the present invention, in which a cordless or wireless telephone handset is employed.

Turning to FIG. 4, shown therein is the integration of a cordless or infra-red (IR) handset 14 with the laptop 11. A telephone handset 14 with IR communication capability can be integrated into the laptop body. As most modem laptop PCS are equipped with an IR communications port, the telephone handset 14 could be made wireless in this manner. The IR interface would be used primarily when the phone handset is lifted from the cradle or tray 17. When in the cradle 17, the telephone handset 14 would be connected to the laptop computer 11 by an electrical connector 41 in the cradle of the laptop 11.

FIG. 4 depicts the integration of the laptop 11 with a cellular/wireless telephone. A cellular telephone 14 can be integrated with the laptop 11, which would allow the user to place normal cellular calls by removing the telephone 14 from its cradle 17 and use it in the conventional manner. In addition, the cellular telephone 14 would have a special connector 42 or contacts that mate with the laptop electrical contacts 41 or connector while sitting in the cradle, thus allowing the user to make cellular calls using the laptop's modem card 21 or device. While in the cradle 17, the cellular telephone 14 could draw power from the laptop's power source or battery (not shown) enabling recharging of the cellular telephone's battery. The telephone itself can have a manual switch allowing the user to manually switch between data and voice modes, if necessary. A manual or auto detection mechanism could allow automatic switching between voice and data modem when the handset 14 is lifted from or placed into the cradle 17.

User Point and Click Input Module

Figure 5:
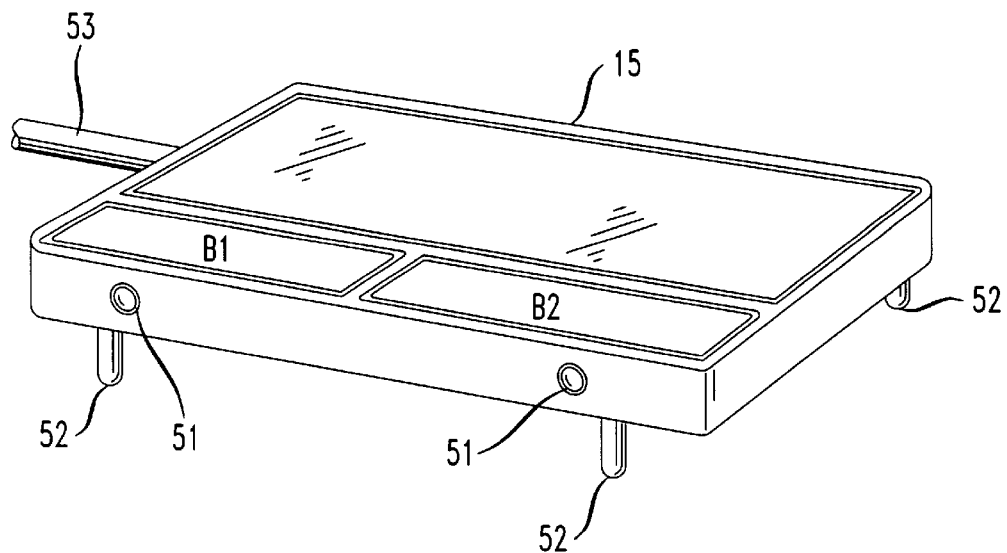
FIG. 5 depicts a top view of the mouse module according to the present invention.

Turning to FIG. 5, depicted therein is the user point and click input module 15, which could be a standard or "mini" mouse, a touchpad, a mini track ball, or any device that enables a user to select something on the display and indicate to the computer that selection. The mouse module 15 is the same as a standard mouse touch pad, except that it includes supporting feet 52 at the bottom, guides 51 on the sides and a cable connection 53 to its underside. Alternatively, the mouse module 15 could be a small mouse that retracts from the tray 17 with a retractable coiled cord enabling the mouse 15 to be extended to a mouse pad and used as a mouse in the normal manner.

Figure 6:
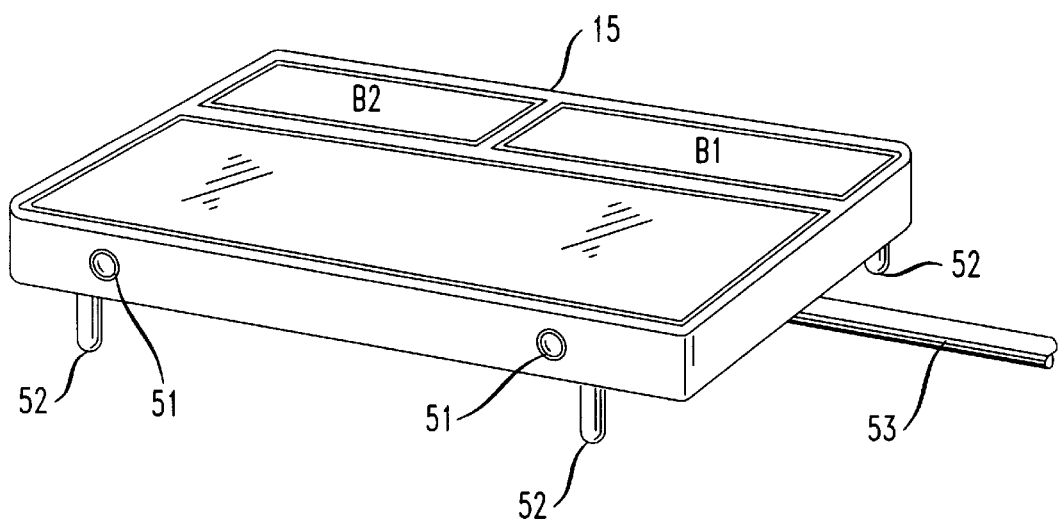
FIG. 6 depicts another top view of the mouse module according to the present invention.

FIG. 6 shows the location of the guides on the opposite side of the mouse module 15.

Supporting Feet

FIG. 5 depicts a top view of the mouse module 15. The support feet 52 are disposed on both sides of the mouse module 15. The supporting feet 52 can be molded plastic knobs that "glide" in coated grooves 54 (see FIG. 7) in the tray 17. The grooves 54 and feet 52 can be coated with silicon, or some other substance that acts as a lubricant, such as "Teflon." Alternatively, the feet 52 can be roller-type bearings that allow the mouse module 15 to slide in the tray 17. There can be one, two, three or four feet 52.

Alternatively, the mouse module 15 could "glide" on rails 81 disposed in the base 82 of the tray 17, which rails are raised sufficiently high so that the mouse module 15 lies above the connector cable 53. In this case, the mouse module 15 could have slots 84 in which the rails 81 engage to enable the mouse module 15 to snap into place and glide in the tray 17. The connector cable 53 is then disposed between the rails 81. Optionally, the rails 17 could act as a receptacle for the connector cable 53 keeping it in place as the mouse module 15 glides along the rails 81. To do so, the rails 81 could have form fitting sides that match a round cable.

In either case, the supporting feet 52 or rails 81 are coated with a non-stick coating, such as polytetrafluoroethylene (also known as Teflon), silicon, graphite, or some other solid lubricant, to make the mouse module 15 glide on the supporting feet 52 or rails 81.

Guides

Figure 7:
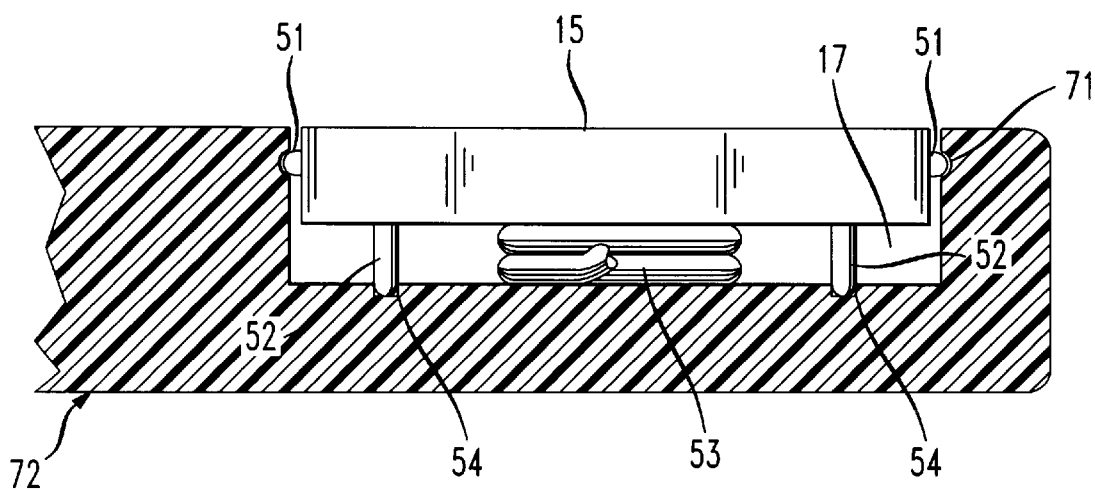
FIG. 7 depicts a side view of one embodiment of the present invention.
Figure 8:
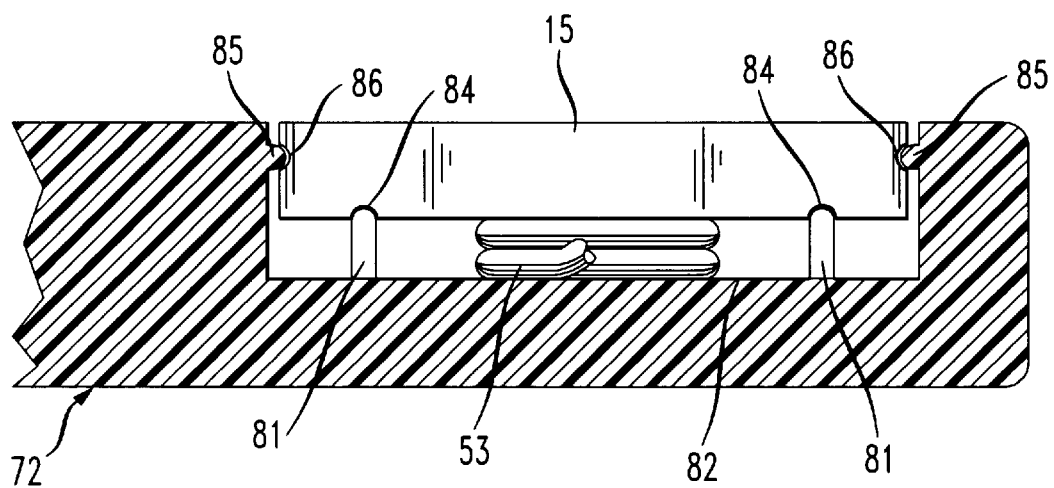
FIG. 8 depicts another side view of one embodiment of the present invention.

Turning to FIG. 7, which is a side cutaway view, on the sides of the mouse module 15 is at least one guide 51 that slides in an accommodating groove 71 in the side 72 of the track 17. There can be one or two guides 51 on each side. One possible embodiment for the guides 51 are four spring-loaded roller bearings made in the mouse module 15, which guide the mouse module 15 in the notched grooves 71. The roller bearings 51 also lock the mouse module 15 in the groove tracks 71.

Alternatively, the guides could be rails 85 that extend from the sides 72 of the tray 17, along which the mouse module 15 glides. In this case, the supporting feet 52 are not necessary, as the guides 85 could be disposed sufficiently high so that when engaged with the mouse module 15, there would be a space between the bottom of the mouse module 15 and the top of the connector cable 53 to prevent the connector cable 53 from interfering with the movement of the mouse module 15. In addition, the guides 85 must provide sufficient load bearing force to maintain the mouse module 15 above the connector cable 53. Also, the mouse module 15 can employ slots 86 in which the rails 85 engage, locking the mouse module 15 into place and enabling the mouse module 15 to glide along the side rails 85. As discussed above, coating the rails 85 and slots 86 with a non-stick coating will improve the glide ability of the mouse module 15.

Another possible alternative embodiment for the guides, is to extend rails from the sides of the mouse module 15 that engage in the grooves 71 in the sides of the mouse tray, locking the mouse module 15 in place, and enabling it to glide along the tray 17. By placing the grooves 71 sufficiently high, the mouse module could travel above the connector cable without interfering with the cable. As discussed above, coating the rails and slots with a non-stick coating will improve the glide ability of the mouse module 15.

Connector Cable

Turning to FIG. 9, which is a cutaway view of the front of the laptop 11 illustrating the mouse module 15 positioning in the right position. The user can simply slide the mouse module 15 to any position desired along the tray. The cable 53 connecting the mouse module to the laptop can be a printed circuit flex cable, or a retractable coiled cable as mentioned above. The mouse module flexible cable 53 is shown mated to a receptacle 91 in the bottom of the tray 17. When the telephone handset 14 is removed, the mouse module 15 can be slid to either side, and then the telephone handset 14 is replaced in the empty space in the tray 17.

FIG. 10 shows a POTS telephone handset coupled to the connector cable 53. As indicated, the connector cable 53 must be approximately 5.5 to 7 inches in length to enable the mouse module 15 (and hence the telephone handset 14) to travel from one side of the tray 17 to the other side. In this embodiment of the connector cable 53, the cable 53 is looped.

What is claimed is:

1. A integrated telephone and computer apparatus comprising:

a) a portable computer having a front edge, and two sides;
b) a telephone handset coupled to the portable computer;
c) a user point and click input module coupled to the computer;
d) a tray in which the user point and click input module and telephone handset are disposed, said tray being parallel to the front edge of the computer; and
e) a slidable connector mechanism coupling the user point and click input module to the computer, wherein the user point and click input module is moveable from a left side to the right side of the computer to accommodate a right- or a left-handed user, and the telephone handset is disposable in a space in the tray not occupied by the user point and click input module.

2. The apparatus according to claim 1, further comprising a glide control mechanism disposed in the tray and locking the user point and click input module in the tray and controlling a movement of the user point and click input module in the tray.

3. The apparatus according to claim 2, wherein the glide control mechanism includes at least two supports maintaining the user point and click input module above the slidable connector mechanism in the tray, and the user point and click input module is movable above the slidable connector mechanism.

4. The apparatus according to claim 3, wherein the at least two supports include two plastic feet having a height that exceeds a thickness of the slidable connector mechanism.

5. The apparatus according to claim 4, wherein the two plastic feet are coated with a non-stick coating.

6. The apparatus according to claim 5, wherein the non-stick coating includes one selected from the group consisting of silicon, polytetrafluoroethylene, graphite, and a solid lubricant.

7. The apparatus according to claim 2, wherein the glide control mechanism includes at least four support feet maintaining the user point and click input module above the slidable connector mechanism in the tray, and the user point and click input module is movable above the slidable connector mechanism.

8. The apparatus according to claim 3, wherein the glide control mechanism includes at least two reciprocating grooves in which the two supports slide as the user point and click input module is moved in the tray.

9. The apparatus according to claim 8, wherein the two grooves are coated with a non-stick coating.

10. The apparatus according to claim 9, wherein the non-stick coating includes one selected from the group consisting of silicon, polytetaatluoroethylene, graphite, and a solid lubricant.

11. The apparatus according to claim 1, wherein the glide control mechanism includes two rails disposed in the tray between which rails the slidable connector mechanism is disposed.

12. The apparatus according to claim 11, wherein the user point and click input module has two accommodating slits in which the two rails engage.

13. The apparatus according to claim 11, wherein the two rails are coated with a non-stick coating.

14. The apparatus according to claim 13, wherein the non-stick coating includes one selected from the group consisting of silicon, polytetrafluoroethylene, graphite, and a solid lubricant.

15. The apparatus according to claim 12, wherein the two slits are coated with a non-stick coating.

16. The apparatus according to claim 15, wherein the non-stick coating includes one selected from the group consisting of silicon, polytetrafluoroethylene, graphite, and a solid lubricant.

17. The apparatus according to claim 2, wherein the glide control mechanism includes at least one side guide that locks the user point and click input module in the tray and maintains the user point and click input module above the slidable connector mechanism as it moves.

18. The apparatus according to claim 2, wherein the glide control mechanism includes at least two side guides that lock the user point and click input module in the tray and maintain the user point and click input module above the slidable connector mechanism as it moves.

19. The apparatus according to claim 3, wherein the glide control mechanism includes at least one side guide that locks the user point and click input module in the tray and guides the user point and click input module while it moves above the slidable connector mechanism.

20. The apparatus according to claim 3, wherein the glide control mechanism includes at least two side guides that lock the user point and click input module in the tray and guide the user point and click input module while it moves above the slidable connector mechanism.

21. The apparatus according to claim 20, wherein the at least two side guides include two spring-loaded roller bearings.

22. The apparatus according to claim 20, wherein the at least two side guides include two rails jutting from the sides of the tray.

23. The apparatus according to claim 22, wherein the at least two side guides further comprise at least two accommodating slits disposed in the sides of the user point and click input module.

24. The apparatus according to claim 20, wherein the two rails are coated with a non-stick coating.

25. The apparatus according to claim 24, wherein the non-stick coating includes one selected from the group consisting of silicon, polytetrafluoroethylene, graphite, and a solid lubricant.

26. The apparatus according to claim 1, wherein the slidable connector mechanism includes a printed circuit flex cable coupled to the user point and click input module.

27. The apparatus according to claim 1, wherein the slidable connector mechanism includes a coiled retractable wire.

28. The apparatus according to claim 26, wherein the slidable connector mechanism includes a connector coupled to the printed circuit flex cable and disposed in a base of the tray.

29. The apparatus according to claim 1, wherein the user point and click input module comprises a touch mouse.

30. The apparatus according to claim 1, wherein the user point and click input module comprises a mini-trackball.

31. The apparatus according to claim 1, wherein the user point and click input module comprises a removable mouse.

32. The apparatus according to claim 1, wherein the telephone handset comprises a cordless telephone handset.

33. The apparatus according to claim 32, wherein the computer includes an infrared communications port and the cordless telephone handset includes an infrared communications port couplable to the infrared communications port on the computer.

34. The apparatus according to claim 32, wherein the computer includes an RF communications port and the cordless telephone handset includes an RF communications port couplable to the RF communications port on the computer.

35. The apparatus according to claim 32, wherein the cordless telephone handset includes a first electrical connection and the tray includes a second electrical connection, and the first electrical connection mates with the second electrical connection when the cordless telephone handset is placed in the tray.

36. The apparatus according to claim 32, wherein the tray includes two electrical connections disposed at either end of the tray, and the cordless telephone handset includes a first electrical connection that mates with either of the two electrical connections when the cordless telephone handset is placed in the tray.

37. The apparatus according to claim 32, further comprising a battery charger, wherein the cordless telephone handset includes a rechargeable battery and a first electrical connection, the tray includes a second electrical connection coupled to the battery charger, which second electrical connection mates with the first electrical connection when the cordless telephone handset is placed in the tray, and the battery charger charges the rechargeable battery in the cordless telephone handset when the first and second electrical connections are mated.

38. The apparatus according to claim 1, wherein the telephone handset includes a telephone cord coupling the telephone handset to the computer.

39. A computer and telephone apparatus comprising:
   a) a laptop computer having a front edge and two sides;
   b) a telephone handset coupled to the laptop computer;
   c) a point and click coupled to the laptop computer;
   d) a storage area in which the user point and click input module and telephone handset are disposed, said storage area being disposed perpendicular to the sides of the laptop computer; and
   e) a slidable connector mechanism coupling the user point and click input module to the laptop computer, wherein the user point and click input module is moveable from a left side to the right side of the computer to accommodate a right- or a left-handed user, and the telephone handset is disposable in a space in the storage area not occupied by the user point and click input module.

40. The apparatus according to claim 39, wherein the telephone handset comprises a cellular telephone handset.

41. The apparatus according to claim 40, wherein the computer includes an infrared communications port and the cellular telephone handset includes an infrared communications port couplable to the infrared communications port on the computer.

42. The apparatus according to claim 40, wherein the computer includes an RF communications port and the cellular telephone handset includes an RF communications port couplable to the RF communications port on the computer.

43. The apparatus according to claim 40, wherein the cellular telephone handset includes a first electrical connection and the tray includes a second electrical connection, and the first electrical connection mates with the second electrical connection when the cellular telephone handset is placed in the tray.

44. The apparatus according to claim 40, wherein the tray includes two electrical connections disposed at either end of the tray, and the cellular telephone handset includes a first electrical connection that mates with either of the two electrical connections when the cellular telephone handset is placed in the tray.

45. The apparatus according to claim 40, further comprising a battery charger, wherein the cellular telephone handset includes a rechargeable battery and a first electrical connection, the tray includes a second electrical connection coupled to the battery charger, which second electrical connection mates with the first electrical connection when the cellular telephone handset is placed in the tray, and the battery charger charges the rechargeable battery in the cellular telephone handset when the first and second electrical connections are mated.

46. The apparatus according to claim 39, wherein the telephone handset includes a switch switching between a data mode and a voice mode.

47. The apparatus according to claim 46, further comprising a detector detecting whether the telephone handset is disposed in the tray and controlling a state of the switch based on the determination of whether the telephone handset is disposed in the tray.

48. An integrated computer and telephone device comprising:
   a) a portable computer having a front edge, and two sides;
   b) a telephone handset being coupled to the computer;
   c) a user point and click input module being coupled to the computer;
   d) a tray in which the user point and click input module and telephone handset are disposed, said tray being disposed parallel to the front edge of the computer; and
   e) an infrared communications port coupling the user point and click input module to the computer, wherein the user point and click input module is moveable from a left side to the right side of the computer to accommodate a right- or a left-handed user, and the telephone handset is disposable in a space in the tray not occupied by the user point and click input module.

49. The device according to claim 48, wherein the user point and click input module includes a removable mouse.

50. An integrated computing and communication device comprising:
   a) a portable computer having a front edge and two sides;
   b) a telephone handset coupled to the computer;
   c) user point and click input module for enabling a user to provide input to the computer, said user point and click input module being coupled to the computer and being movable from a right side of the device to a left side of the device;
   d) receptacle means for the telephone handset and the user point and click input module, said receptacle being disposed parallel to the front edge of the computer; and
   e) coupling means for coupling the user point and click input module to the computer, said coupling means providing coupling between the computer and the user point and click input module whether the user point and click input module is located on the right side of the device or the left side of the device, and the telephone handset is disposable in a space in the receptacle means not occupied by the user point and click input module.

* * * * *